US007010041B2

(12) United States Patent
Graziani et al.

(10) Patent No.: US 7,010,041 B2
(45) Date of Patent: Mar. 7, 2006

(54) PROCESS FOR CHANGING THE SYNTAX, RESOLUTION AND BITRATE OF MPEG BITSTREAMS, A SYSTEM AND A COMPUTER PRODUCT THEREFOR

(75) Inventors: Andrea Graziani, Varese (IT); Luca Celetto, Udine (IT); Daniele Alfonso, Alghero (IT); Fabrizio Basso, Iglesias (IT); Alessandro Cremonesi, Sant'Angelo Lodigiano (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 574 days.

(21) Appl. No.: 10/072,818

(22) Filed: Feb. 8, 2002

(65) Prior Publication Data
US 2002/0159528 A1    Oct. 31, 2002

(30) Foreign Application Priority Data
Feb. 9, 2001    (EP)    .................................. 01830084

(51) Int. Cl.
*H04N 7/12*    (2006.01)
(52) U.S. Cl. ........................... 375/240.16; 375/240.25; 375/240.26
(58) Field of Classification Search ........... 375/240.16, 375/240.25, 240.26
See application file for complete search history.

(56) References Cited

U.S. PATENT DOCUMENTS

| 5,144,424 A | * | 9/1992  | Savatier ................. 375/240.03 |
| 5,675,387 A | * | 10/1997 | Hoogenboom et al. 375/240.15 |
| 5,724,475 A | * | 3/1998  | Kirsten ........................ 386/109 |
| 5,870,146 A |   | 2/1999  | Zhu ............................. 178/405 |
| 5,920,353 A | * | 7/1999  | Diaz et al. ............. 375/240.15 |
| 5,926,573 A | * | 7/1999  | Kim et al. ................... 382/239 |
| 5,940,130 A |   | 8/1999  | Nilsson et al. .............. 348/416 |
| 6,181,711 B1 | * | 1/2001 | Zhang et al. ................ 370/468 |

(Continued)

FOREIGN PATENT DOCUMENTS

WO    WO 97/47128    12/1997

(Continued)

OTHER PUBLICATIONS

Kim, D. et al., "Transcoding DV into MPEG-2 in the DCT Domain," *Proceedings of the IS&T/SPIE Conference on Visual Communications and Image Processing*, San Jose, CA, Jan. 1999, pp. 1026-1032.

(Continued)

*Primary Examiner*—Mehrdad Dastouri
*Assistant Examiner*—Patrick Cathey, II
(74) *Attorney, Agent, or Firm*—Lisa K. Jorgenson; Robert Iannucci; Seed IP Law Group PLLC

(57) ABSTRACT

In order to generate, starting from an input MPEG bitstream, an output MPEG bitstream having at least one entity chosen among syntax, resolution, and bitrate modified with respect to the input bitstream, first portions and second portions are distinguished in the input bitstream, which respectively substantially do not affect and do affect the variation in bitrate. When at least one between the syntax and the resolution is to be modified, the first portions of the input bitstream are subjected to the required translation, then transferring said first portions subjected to syntax and/or resolution translation to the output bitstream. When the resolution is left unaltered, the second portions are transferred from the input bitstream to the output bitstream in the substantial absence of processing operations. When the resolution is changed, the second portions of the input bitstream are subjected to a filtering in the domain of the discrete cosine transform.

27 Claims, 6 Drawing Sheets

Figure 1:
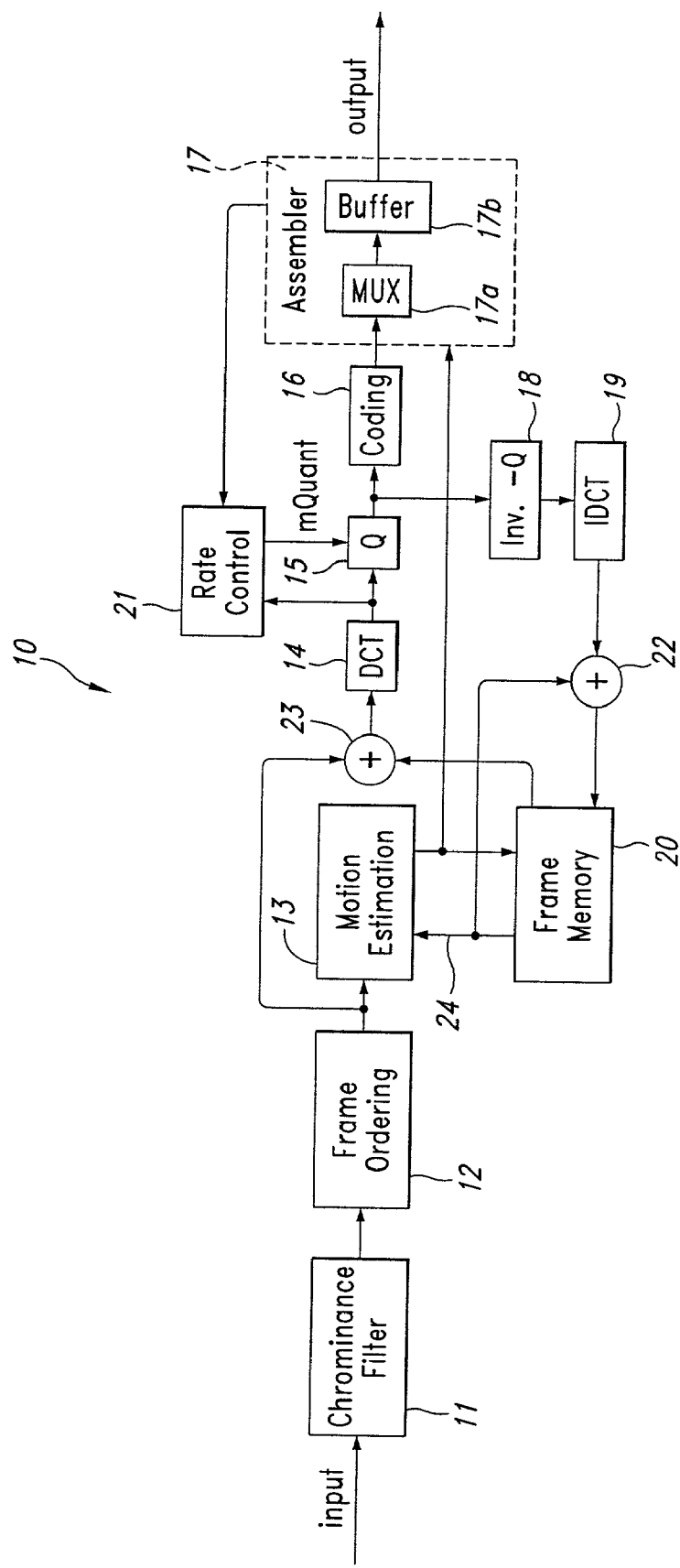

U.S. PATENT DOCUMENTS 6,259,741 B1 * 7/2001 Chen et al. ............ 375/240.26
6,498,865 B1 * 12/2002 Brailean et al. ............ 382/239
6,647,061 B1 11/2003 Panusopone et al. .. 375/240.12

FOREIGN PATENT DOCUMENTS

WO     WO 00/51357     8/2000

OTHER PUBLICATIONS

Shen, B. et al., "Adaptive Motion-Vector Resampling for Compressed Video Downscaling," *Circuits and Systems for Video Technology, IEEE Transaction*, vol. 9, Issue 6, pp. 929-936, Sep. 1999.

* cited by examiner

PROCESS FOR CHANGING THE SYNTAX, RESOLUTION AND BITRATE OF MPEG BITSTREAMS, A SYSTEM AND A COMPUTER PRODUCT THEREFOR

BACKGROUND OF THE INVENTION

1. Field of the Invention

The present invention relates to the processing of bitstreams encoded according to the MPEG standard.

The MPEG (Moving Pictures Experts Group) standard proposes a set of algorithms dedicated to the compression of sequences of digital (audio/video) signals. The subject of the specification does not regard so much the use of these tools in the encoding phase as rather the way of interpreting the syntax of the encoded bitstream and the use of said tools during decoding (i.e., when carrying out decompression). The techniques used are based on the reduction in spatial and temporal redundancy of the sequence.

2. Description of the Related Art

In general, according to the MPEG standard, reduction in spatial redundancy is obtained by independently compressing the individual images, using a discrete cosine transform (DCT), quantization and Huffman coding.

Reduction in temporal redundancy is obtained by exploiting the correlation that exists between successive and/or temporally close images in the sequence. Approximately it is assumed that each portion of an image could be expressed locally as the translation of a portion of a previous and/or subsequent image in the sequence.

For this purpose, the MPEG standard reviews three types of images indicated by I (Intra-Coded Frame), P (Predicted Frame), and B (Bidirectionally Predicted Frame).

The images I are encoded in an altogether independent way; the images P are encoded with respect to a previous image I or P in the sequence; finally, the images B are encoded with respect to two images of an I type or P type, one preceding and the other following in the sequence.

A typical succession of images may be as follows: IBBPBBPBBIB . . . .

This is the order in which the images are displayed, but since each image P is encoded with respect to the preceding image I or P, and each image B is encoded with respect to the preceding and following image I or P, it is necessary for the decoder to receive the images P before the image B, and the images I before the image P. Consequently, the order of transmission of the images will be IPBBPBBIBB . . . .

The images are processed by the encoder in a sequential way in the order indicated, and subsequently sent to a decoder which decodes them and re-orders them, so enabling their subsequent display. To encode an image B it is necessary for the encoder to maintain the images I and P—encoded and then decoded previously—to which the image B refers, in a special memory referred to as "frame memory", and this operation requires an appropriate amount of memory.

The above methodology finds a valid example of implementation in the MPEG 2 and MPEG 4 standards.

In this connection, the diagram of FIG. 1 illustrates, in the form of a block diagram, the typical structure of a video MPEG encoder.

The system, designated as a whole by 10, comprises, in the first place, a module 11 designed to carry out filtering of the chrominance (chroma) component of the video signal passing from the format 4:2:2 to the format 4:2:0. Basically, the module 11 contains a bandpass filter, which operates on the chrominance component, replacing each pixel with a weighted sum of the surrounding pixels that are set on the same column multiplied by appropriate coefficients. This enables the subsequent sub-sampling by two to obtain a halved vertical definition of the chrominance.

The reference number 12 designates a frame-ordering module made up of one or more frame memories. The module 12 is designed to supply at output the frames in the encoding order required by the syntax of the MPEG standard.

For example, if the input sequence is IBBPBBP, etc., the order at output will be IPBBPBB . . . .

As has already been explained, I (Intra-Coded Picture) is a frame and/or a half-frame containing temporal redundancy; P (Predicted Picture) is a frame and/or a half-frame the temporal redundancy of which with respect to a preceding image I or P (which has been previously encoded/decoded) has been removed; by B (Bidirectionally Predicted Picture) a frame and/or half-frame is indicated the temporal redundancy of which with respect to the preceding image I and the subsequent image P (or else, the preceding image P and the subsequent image P, or again, the preceding image P and the subsequent image I) has been removed. In both cases, the images I and P are to be considered already encoded/decoded.

The reference number 13 designates the module for estimating motion, i.e., the block that is able to remove the temporal redundancy of the images P and B.

It is to be recalled that the above block works only on the most energetic component (and hence one that is rich in information) of the images that make up the sequence to be encoded, such as the luminance sequence.

One of the important concepts for carrying out encoding is the estimation of the motion, and the MPEG standard is based upon the considerations specified below.

A set of pixels of an image frame may be set in a position of the subsequent image obtained by translation of the image in the previous frame.

Suppose, for example, that this set of pixels is a square of 16×16 pixels. This set of data, together with the color information associated to it, is usually referred to as "macroblock".

Of course, the changes in position of the objects may expose to the filming camera parts that were previously not seen, as well as modifications in the shapes of the objects themselves (for example, as a result of a zooming function, etc.).

The family of algorithms that are able to identify and associate the said portions of images is referred to as "estimation of motion". This association makes it possible to calculate the portion of difference image, thus removing the redundant temporal information and rendering the subsequent process of compression by means of a DCT, quantization and entropic encoding more effective.

The reference number 14 designates a module or block that implements, on the signal coming from an adder node 23 (which will be explained in greater detail later), the DCT according to the MPEG standard. The image I and the images P and B, considered as error images, are divided into 8×8 blocks Y, U, V, on which DCT transformation is applied.

The reference number 15 designates a quantizer module (Q). Here the 8×8 block resulting from DCT transformation is divided by a matrix, referred to as "quantization matrix", such as to reduce, more or less drastically, the dimension in number of bits of the DCT coefficients. In this case, the tendency is to remove the information associated to the higher frequencies, which are less visible to the human eye. The result is re-ordered and sent to the subsequent block, designated by 16, which implements the run-length coding (RLC) and the variable-length coding (VLC).

In particular, RLC aims at taking into account the fact that the code words at output from the quantizer module 15 tend to contain zero coefficients in a more or less high number, followed by non-zero values. The zero values, which precede the first non-zero value are counted, and this count constitutes the first portion of a word, the second portion of which is the non-zero coefficient. This method of packeting data is defined as "run-length coding".

The result thus obtained undergoes VLC "variable-length coding", also known as Huffman coding.

This type of coding takes into account the fact that some pairs of values tend to assume more likely values than others. The more likely values are coded with very short words (2/3/4 bits), whereas the less likely values are coded with longer words. Statistically, the number of bits produced at output is smaller than the number of bits at input, or rather the number of bits that there would be if the said coding were not carried out.

In order to be able to construct the final syntax envisaged by the MPEG standard, the data generated by the variable-length encoder (output from the module 16), the quantization matrices, the vectors of motion (output from the module 13), and other syntactic elements are sent to an assembler module, designated as a whole by 17 and comprising a multiplexer 17a and a buffer 17b.

The limit size of the buffer is specified by the standard itself and cannot be exceeded.

The quantization block 15 presides over respect of the said limit, rendering more or less drastic the process of division of the DCT coefficients according to whether the latter are more or less close to filling the buffer and according to the energy of the 8×8 source block taken upstream of the process of estimation of motion and DCT transformation.

The reference numbers 18 and 19 designate two modules that basically implement a feedback loop to the estimation-of-motion function represented by the module 13.

In particular, the module designated by 18 performs on the data undergoing quantization in the module 15 an inverse-quantization function.

The signals thus obtained undergo inverse DCT (IDCT) in the module 19. In practice, the DCT function is inverted and applied to the 8×8 block at output from the process of inverse quantization. The function performed in the module 19 enables passage from the domain of spatial frequencies to the pixel domain, obtaining at output:

the decoded frame (half-frame) I that is to be stored in an appropriate frame memory for subsequent removal of temporal redundancy, with respect thereto, from the subsequent images P and B; and the decoded prediction error frame (half-frame) P and B which is added to the information previously removed during the step of estimation of motion; in the P case, this resulting sum, stored in an appropriate frame memory, is used during the process of estimation of motion for the subsequent images P and B.

The above is performed in the module designated, as a whole, by 20, where the frame memories are usually distinct from the re-ordering memories.

The reference number 21 designates the rate-control module which interacts for this purpose with the output of the module 14 and the output of the buffer 17b, supplying a corresponding control signal mQuant to the module 15.

Finally, the reference numbers 22 and 23 designate two adder nodes in which the following are respectively added:

the output of the IDCT module 19 and the output, designated by 24, on which the data relating to the motion vectors are transferred from the module 20 to the estimation-of-motion module 13; and the output of the re-ordering module 12 and the output of the module 20, and this in view of supply to the module 14 which implements the DCT function.

The foregoing obviously corresponds to altogether current know-how for persons skilled in the sector, a know-how which is here recalled merely for purposes of reference.

Figure 2:
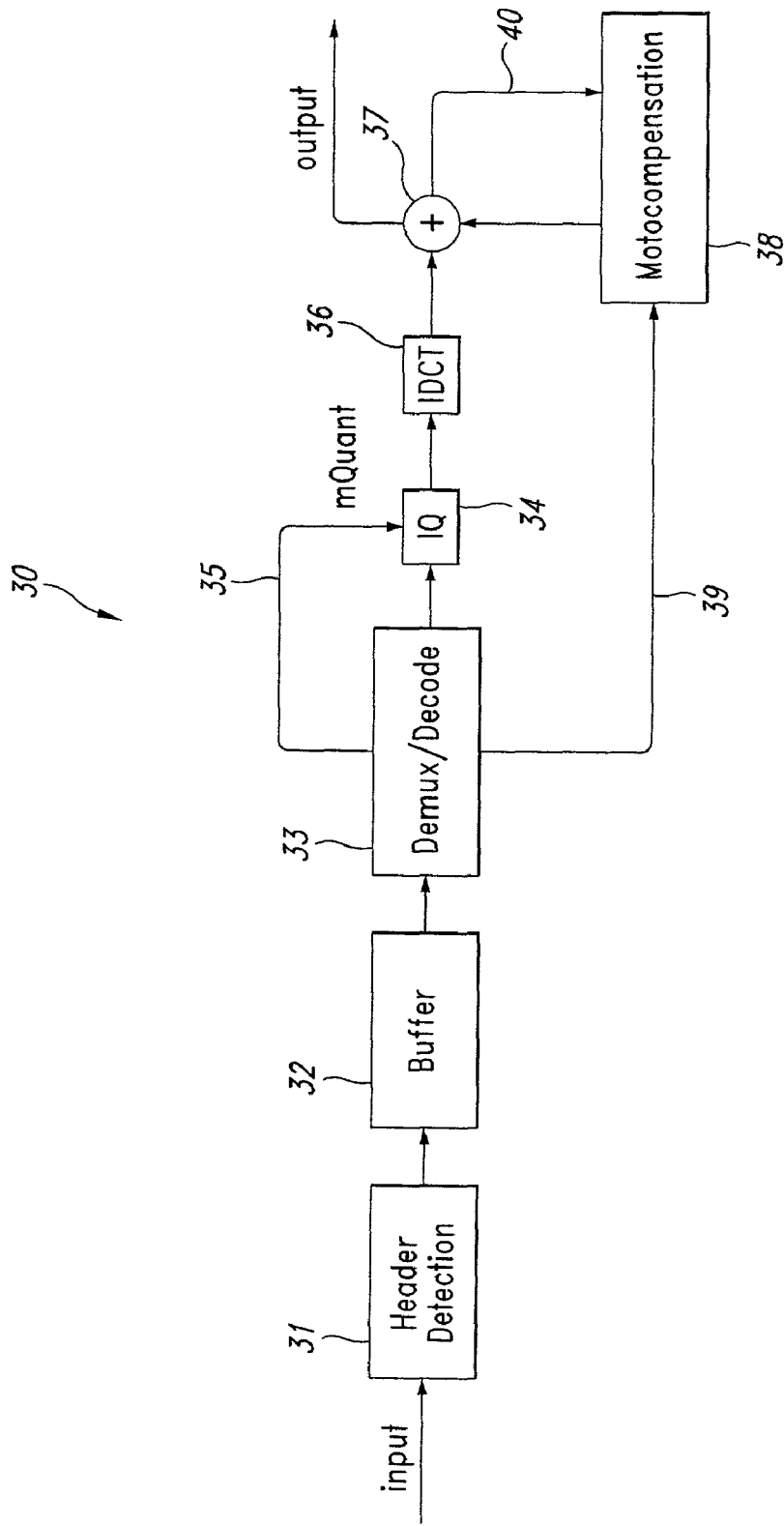

The same also applies to the structure of an MPEG decoder as represented in FIG. 2.

In the above-mentioned figure it is possible to note that the said demodulator, designated as a whole by 30, in the first place carries out, in a module designated by 31, detection of the so-called "headers" in the framework of the MPEG-encoded bitstream and the subsequent accumulation of the data received within a buffer 32 designed to absorb any discontinuities in the said stream.

The module 33 is responsible for performing the functions of demultiplexing, inverse VLC decoding, and inverse decoding of the run-level pairs in view of forwarding of the data thus obtained to a module 34. Here, under the control of the signal mQuant supplied by the module 33 itself on a line 35, the inverse-quantization function (IQ) is performed.

The signal thus obtained is then passed onto to a module 36 which performs the inverse DCT function, the aim being to proceed, in an adder node 37 to reconstruction of the output signal according to the signal generated by the motocompensation node 38 which receives, from the module 33, the data regarding the motion vectors on a line 39. In the node 37 also the prediction error is calculated for decoding the subsequent images P and B (line 40).

It may therefore be stated that the processes illustrated in FIGS. 1 and 2 are two concurrent processes cascaded together.

In the actual use of the MPEG standard it is therefore possible to transmit (or record) films, or, in general, video sequences on a variety of channels and media, each of which has its own characteristics of capacity, speed and cost.

For example, the distribution of a film starting from the master recording may take place on a DVD medium, via satellite, via radio antenna, or via cable.

The band available for transmission may therefore be different from the one envisaged in the step of decoding of the video sequence according to the MPEG standard.

Consider, for example, encoding a 6-Mbit/s sequence according to the MPEG 2 standard.

If the attempt were made to use a 384-kbit/s UMTS channel, the transmission would in general be impossible.

The same problem arises also at the level of the decoders which in general are not able to decode bitstreams in compliance with an MPEG specification that is different according to type, profile and level from that for which the decoders themselves were prepared.

With regard to MPEG 2 and MPEG 4 standards, there thus emerges the problem of ensuring that a bitstream encoded according to a given standard should be convertible into a new bitstream encoded according to a different standard and/or for channels with different bitrates so as to enable re-adaptation to the characteristics of the transmission medium and/or the decoding system.

In particular, it is possible to have combinations of use in which the encoder operates according to the MPEG 2 standard, whilst the decoding (or transmission) function is carried out not only according to the MPEG 2 standard, but also possibly according to the MPEG 4 standard, and, in a dual way, situations in which the encoding is carried out according to the MPEG 4 standard, whilst decoding and transmission is carried out not only with the MPEG 4 standard, but also with the MPEG 2 standard.

There thus exists the need to be able to modify the bitrate, resolution, and syntax of an MPEG bitstream generated following upon encoding of the source with bitrate B1 so as to give rise to a stream having syntax and resolution identical to or different from the starting ones, the said second stream having a bitrate B2, where B2 may be smaller than, greater than, or equal to B1.

There may then also arise the need to modify the horizontal and vertical dimensions and/or the resolution of the encoded image.

In order to achieve the above target, in the prior art there has already been proposed the solution of proceeding by decoding the MPEG bitstream, then proceeding to the change of horizontal resolution and/or on the decoded signal, and then to the subsequent recording of the latter using an MPEG encoder.

This solution is in actual fact highly complex from the computational point of view, also on account of the numerous different possible combinations, in view of the fact that the input and output bitstreams may be either MPEG 2 or MPEG 4.

Figure 3:
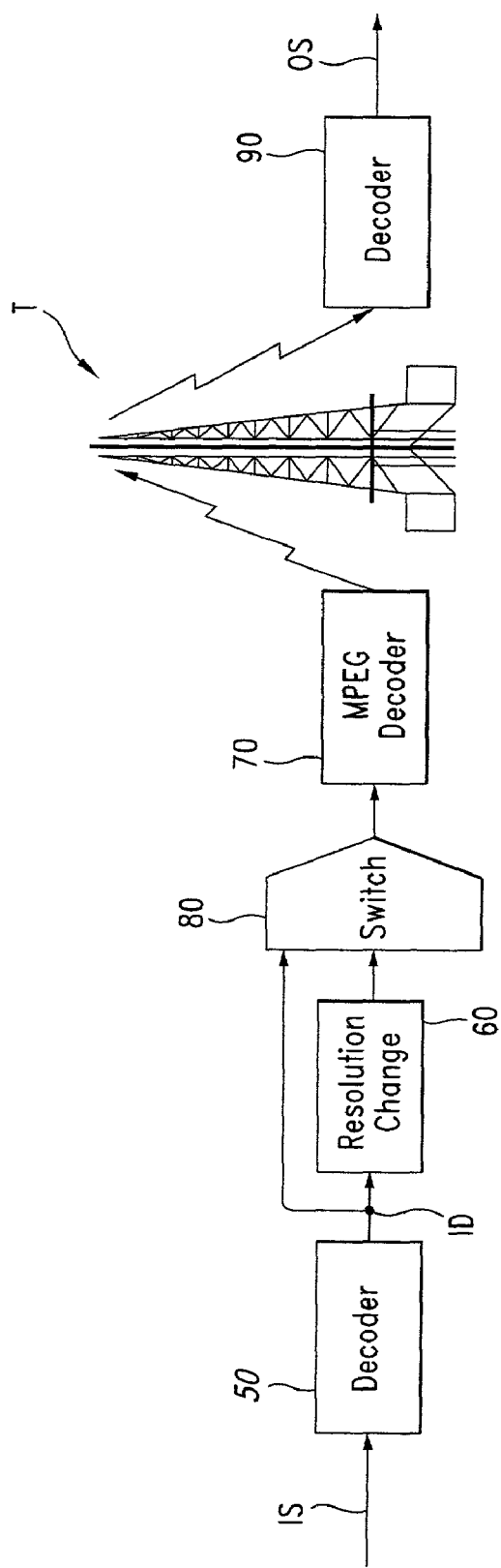

To clarify the above concept further, reference may be made to the diagram of FIG. 3, which is a schematic illustration of a solution for MPEG transcoding performed according to the known art.

On the assumption of operating on an input bitstream IS encoded according to the MPEG 2 or MPEG 4 standard, the reference number 50 designates a decoder that carries out a transformation of the MPEG bitstream (it is irrelevant whether specification 2 or specification 4) into decoded images ID, which are a sequence of frames.

The reference number 60 designates a module that is able to carry out a possible change of resolution on the basis of a classic technique which employs finite impulse response (FIR) filters.

The FIR filter in question performs a transformation based upon the availability of a certain number N of pixels for each component of luminance and chrominance of the image. These pixels are multiplied by appropriate weights, and the results are accumulated and divided by the sum of said weights. Finally, some of the pixels are not transmitted in the resulting image, depending upon the mutation factor of the chosen resolution.

The signal that has undergone change of resolution in the module 60 is then fed to an MPEG encoder 70 which is able to generate a syntax in conformance with the MPEG 2 standard or MPEG 4 standard in view of the transmission schematically represented in T.

Starting from an encoded bitstream with arbitrary bitrate B1, it is always possible to obtain an encoded bitstream with bitrate B2 by simply connecting the output of the decoder 50 to the input of the change-of-resolution block 60. The output from the latter is then connected to the input of the encoder 70 programmed to encode at an Mbit/s bitrate B2.

The block designated by 80 is simply a switch, which is there to indicate the fact that the change-of-resolution operation is in itself optional, so that, in the case where it is not necessary to proceed to the change of resolution, the sequence of frames ID may be directly fed to the encoder 70 without undergoing change of resolution.

Finally, downstream of transmission (it is to be recalled that, for the purposes of the present invention, here the term "transmission" also includes recording on a physical medium, such as a DVD) the MPEG (re)coded signal is fed to a decoder 90 which is able to read and decode the bitstream received according to a syntax in conformance with the MPEG standard (either MPEG 2 or MPEG 4) in view of the generation of an output video sequence OS.

If the block diagrams of FIGS. 1 and 2 are borne in mind, it will be immediately realized that the sequence of processes illustrated in FIG. 3 presents a decidedly high computational complexity.

The transcoding operation represented in the diagram of FIG. 3 entails, in fact, as far as the decoder 50 is concerned, the execution of the following steps:

inverse Huffman coding;
inverse Run-Length coding;
inverse quantization;
inverse discrete cosine transform;
motocompensation;
filtering; and
change of resolution (where envisaged).

For the encoder 70, the following operations become necessary:

pre-processing;
estimation of motion;
calculation of prediction error;
cosine transform;
quantization;
run-length coding;
Huffman coding;
inverse quantization;
inverse discrete cosine transform; and
motocompensation.

Finally, for the receiving decoder, the following operations must be carried out:

inverse Huffman coding;
inverse run-length coding;
inverse quantization;
inverse discrete cosine transform; and
motocompensation.

The computational cost lies almost entirely in the estimation of motion, followed by the direct and inverse cosine transforms and motocompensation. Quantization and the (direct and inverse) run-length and Huffman codings constitute, instead, a contribution smaller than the previous ones to the overall cost.

The quality of the resulting output bitstream OS derives, instead, from the information content of the quantized coefficients. This depends upon the implementation of the encoder (the decoder is uniquely defined by ISO/IEC 13818-2 Directives for the MPEG 2 standard and by ISO/IEC 14496-2 Directives for the MPEG 4 standard), upon the effectiveness of its estimator of motion, and upon the quality and precision of the rate control.

BRIEF SUMMARY OF THE INVENTION

Aspects of the present invention provide a solution for transcoding between MPEG bitstreams, in particular bitstreams of different types (MPEG 2 and MPEG 4), which may enable change of syntax, resolution and bitrate without recourse to the extremely burdensome solution illustrated previously.

Further aspects include a process for generating an output MPEG bitstream from an MPEG input bitstream, said MPEG output bitstream having at least one entity chosen among syntax, resolution, and bitrate modified with respect to said input bitstream. Further aspects include an operation of distinguishing, in said input bitstream, non-affecting portions that substantially do not affect variation in bitrate and affecting portions that substantially do affect variation in bitrate. Further aspects include an operation of subjecting said non-affecting portions of said input bitstream to translation of said syntax into the syntax of said output bitstream by transferring said non-affecting portions subjected to syntax translation to said output bitstream when said syntax is to be modified between said input bitstream and said output bitstream.

Further aspects include an operation of subjecting said non-affecting portions of said input bitstream to translation of said resolution into the resolution of said output bitstream by transferring said non-affecting portions subjected to the resolution translation to said output bitstream when said resolution is to be modified between said input bitstream and said output bitstream. Further aspects include an operation of transferring said affecting portions from said input bitstream to said output bitstream in substantial absence of processing operations when said resolution is left unaltered between said input bitstream and said output bitstream. Further aspects include an operation of subjecting said affecting portions of said input bitstream to a filtering in the domain of the discrete cosine transform, then transferring said affecting portions subjected to filtering in the domain of the discrete cosine transform to said output bitstream when said resolution is to be modified between said input bitstream and said output bitstream.

Aspects of the invention also regard the corresponding system (which can be implemented, for example, in the form of a dedicated processor, such as a DSP), as well as the corresponding computer program product, namely, the set of program codes which may be loaded in the memory of a digital processor, in particular of the general-purpose type and which may enable the processor in question to carry out the process according to aspects of the invention.

Basically, the solution according to aspects of the invention envisages the merging of a decoder with an encoder in an ensemble designed specifically for variation or else conservation of the bitrate of a bitstream.

The solution according to aspects of the invention enables reduction in computational complexity and an improvement or conservation of the quality of the output signal with respect to the input signal.

In the solution according to aspects of the invention, the portions of bitstream that do not significantly affect reduction of the bitrate are not processed, but simply translated according to the syntax and resolution of the target standard. The motion vectors are appropriately filtered by means of a transformation based upon the availability of a certain number M of motion vectors associated to the macroblocks, which are to be merged into the new macroblock, or else surround those that are to be merged into the new macroblock. The motion vectors are multiplied by appropriate weights, and the results are accumulated and divided by the sum of the weights. In fact, the motion field must be appropriately scaled to be associated to the pixel macroblocks that characterize the target resolution.

The portions of the bitstream that significantly affect the reduction in bitrate are basically the DCT coefficients. In particular, if it is not necessary to make any change of resolution, no further filtering of the DCT coefficients for the blocks contained in the macroblocks of the input bitstream is carried out. Instead, if it is necessary to effect a change of resolution, a filtering is carried out in the domain of the DCT.

Other features and advantages of the invention will become apparent from the following detailed description, taken in conjunction with the accompanying drawings.

BRIEF DESCRIPTION OF THE SEVERAL VIEWS OF THE DRAWING(S)

Figure 4:
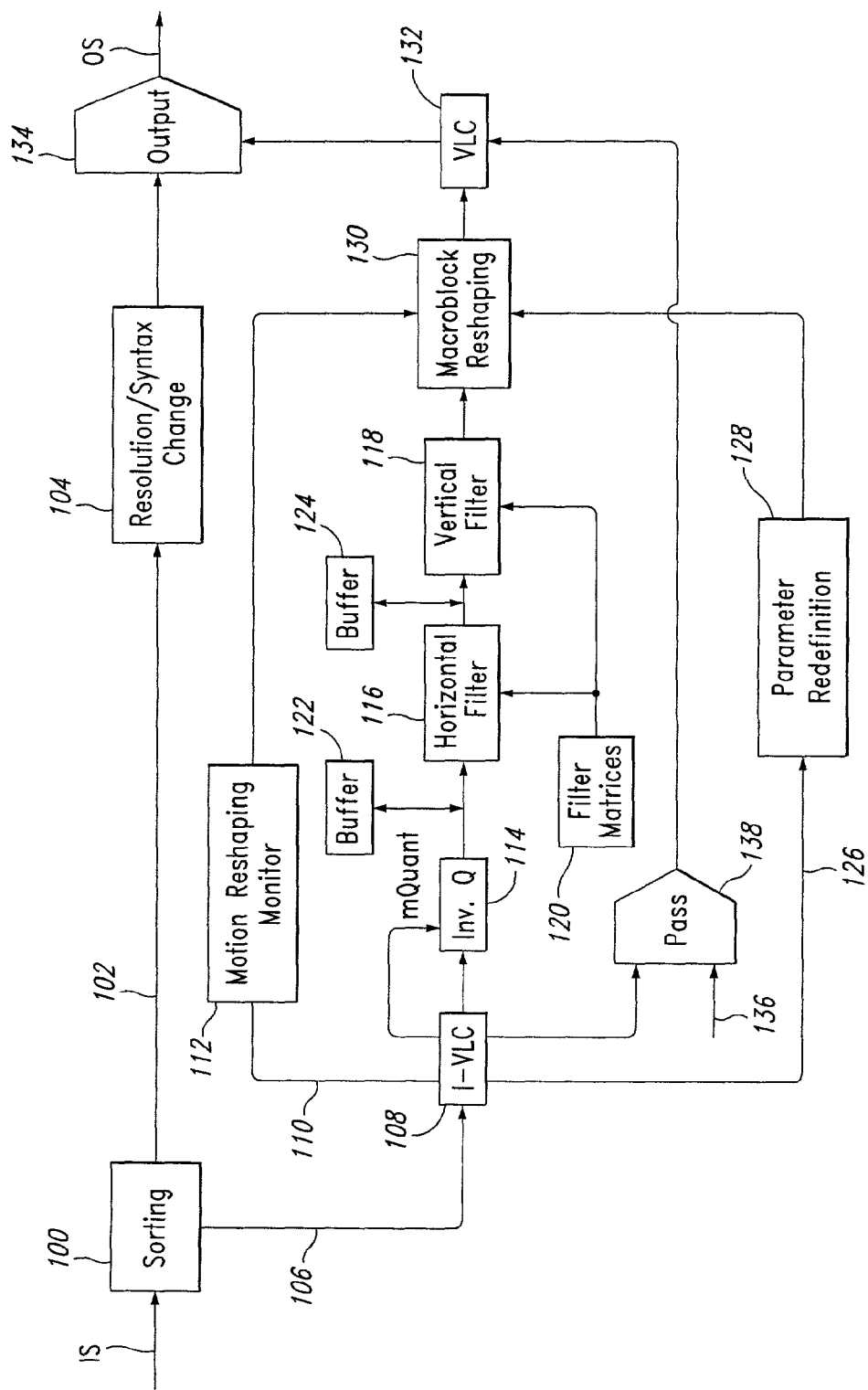
Figure 5A:
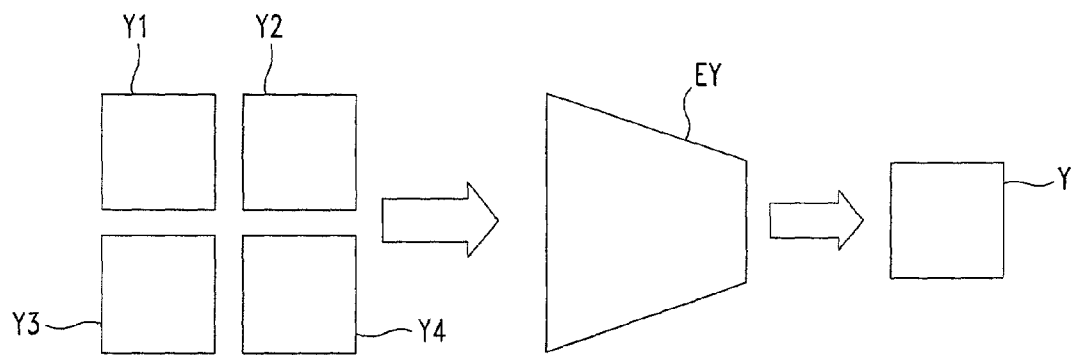
Figure 5B:
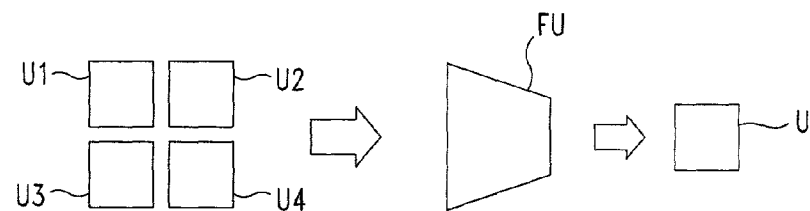
Figure 5C:
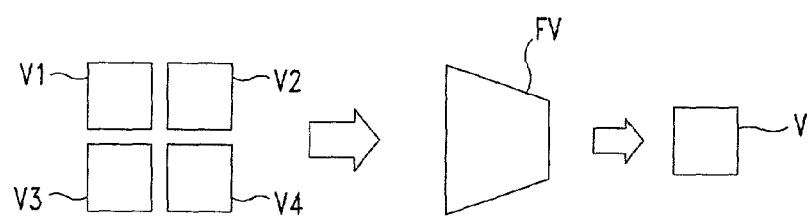
Figure 6:
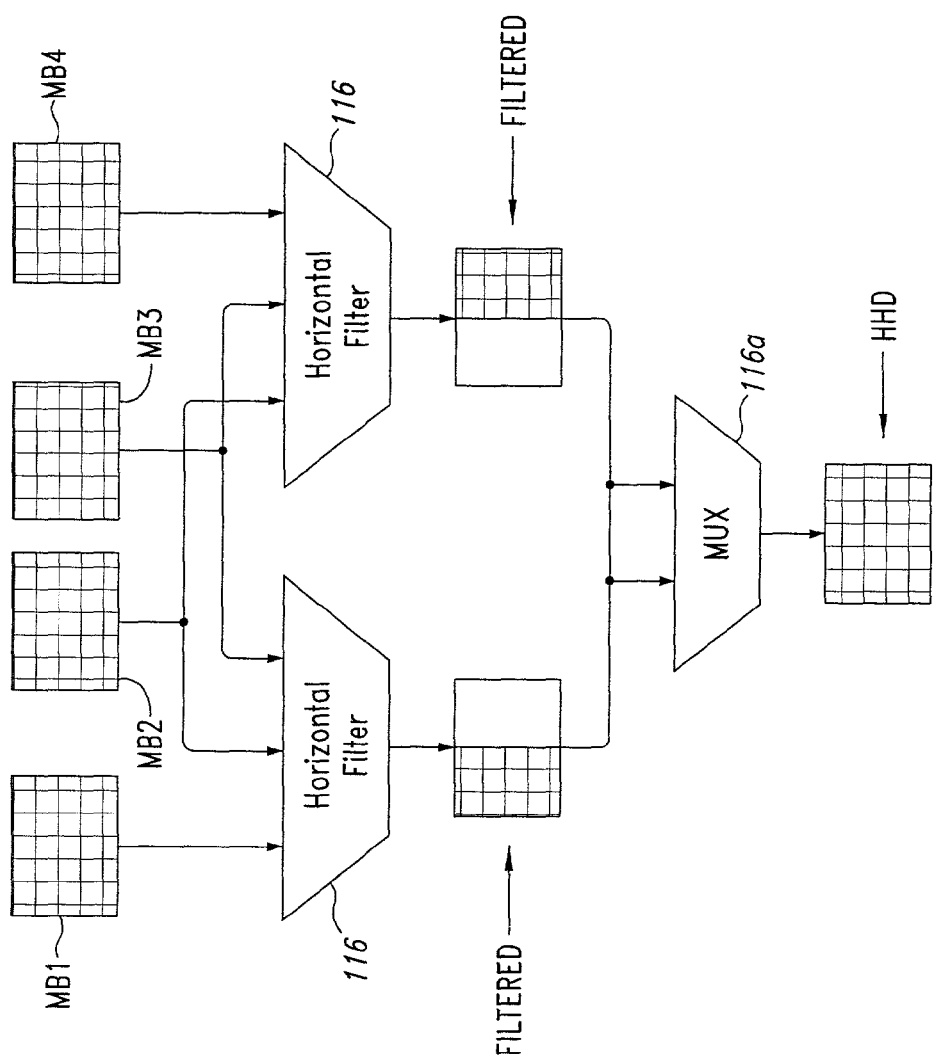

An embodiment of the invention will now be described, purely by way of non-limiting example, with reference to the attached drawings, in which:

FIGS. 1 to 3, which regard the prior art, have already been extensively described previously;

FIG. 4 illustrates, in the form of a block diagram, an embodiment of the solution according to the invention; and FIG. 5 (divided into three parts designated by a, b and c) and FIG. 6 illustrate the embodiment of the solution according to the invention in greater detail.

DETAILED DESCRIPTION OF THE INVENTION

Basically, the purpose pursued by the solution illustrated in FIG. 4 is to start from an input bitstream IS (whether MPEG 2 or MPEG 4) and to generate, starting therefrom, an output bitstream OS (again, either MPEG 2 or MPEG 4, according to the requirements), with the possibility of effecting the following changes: i) change of syntax; ii) change of resolution; and iii) change of bitrate.

It will, on the other hand, be appreciated that it is by no means imperative to make all three of the above changes simultaneously. Consequently, even though with reference to FIG. 4a solution will be described that is able to perform all three changes in question, it is evident that the solution according to an embodiment of the invention is suitable for being applied even in versions where only one or only two of the said changes are made.

The input bitstream IS is fed from a sorting module 100, which performs a function of parsing of the headers. This function basically aims at distinguishing the portions of the bitstream that do not significantly affect reduction of the bitrate from those that, instead, do significantly affect reduction of the bitrate (basically, the DCT coefficients).

The former portions (i.e., the ones that do not affect reduction in bitrate) are sent, through a line 102, to a module 104, which carries out the function of change of resolution and syntax.

This is obtained by accessing the syntax fields which store the aforesaid values and by changing their binary coding into the values corresponding to the target resolution and bitrate.

The latter portions of the bitstream (ie., the ones that may significantly affect reduction in bitrate) are, instead, sent along a line 106 to a block 108, which basically carries out the inverse VLC transform.

In particular, the motion vectors that derive from this operation are sent back, on a line 110, to a block 112, which monitors the function of reshaping of the motion vectors. This is basically a transformation based upon the availability of a certain number M of motion vectors associated to the macroblocks that are to be merged into the new macroblock or surround those that are to be merged into the new macroblock. The motion field must be appropriately scaled to enable the association of pixels that characterize the target resolution to the macroblocks.

Downstream of the module 108, there is also performed, in a module 114, the inverse-quantization function, then submitting the result that derives therefrom to functions of horizontal filtering 116 and vertical filtering 118 (of course the order could be reversed), which are carried out, according to the modalities described in greater detail in what follows with reference to FIGS. 5 and 6, according to the filtering matrices schematically represented in 120 and definable by the user.

The reference numbers 122 and 124 designate one or more local buffers designed to operate as an aid to the filtering operations performed by the modules 116 and 118.

The reference number 126 designates, instead, a further line on which the results deriving from the inverse VLC coding operation are sent to a module 128, which basically superintends a redefinition of the macroblock parameters according to the modalities described in greater detail in what follows.

The aim of the foregoing is to arrive, in the module designated as a whole by 130, at an action of reshaping of the macroblocks, which, after a prior new VLC coding, performed in the module designated by 132, are sent back to an output node 134 in which the portions of bitstream originally switched on the line 102 and on the line 106 are again recombined together so as to generate the output bitstream OS.

It will be noted that the inverse VLC decoding operation performed in the module 108 and the (new) VLC coding operation performed in the module 132 are in fact linked together to take into account the MPEG 2 and MPEG 4 standards involved (respectively at input and at output). The aforesaid modules receive at input also the weighting matrices, which may possibly be defined by the user and introduced into the system on a line 136 and used by a module 138, in particular in such a way as to enable, when the resolution is to be left unaltered, the second portions of the input bitstream IS, namely, the ones that in themselves affect the reduction of the bitrate, to be transferred to the output bitstream OS in the substantial absence of processing operations, i.e., without further filtering of the DCT coefficients regarding the blocks contained in the macroblocks of the input bitstream IS.

If, instead, it is necessary to make the change of resolution, it is also necessary to proceed to a filtering in the DCT domain. This takes place according to the modalities illustrated in greater detail in FIGS. 5 and 6.

Of course it is to be recalled that, as has already been said previously, the functional-block representation provided by FIG. 5 corresponds to processing operations that may be carried out using both dedicated processors and general-purpose processors that are adequately programmed (in a way of itself known, once the functional specifications that it is intended to adopt are known).

The part a) of FIG. 5 shows, for example, how from four luminance macroblocks (each consisting of 16×16 pixels) designated by Y1 to Y4 just one is extracted EY, designated by Y, in the case of a subsampling factor equal to 2.

The parts of FIG. 5 designated by b) and c) show, instead, that, for the chrominance component, respectively U and V 4:2:0 it is necessary to have available four 8×8 blocks designated by U1 to U4 and V1 to V4 to merge them, FU and FV, into a single block, designated by U or V, by means of filtering.

The filtering operation is then based upon steps illustrated in FIG. 6.

In particular, if a certain number of macroblocks are indicated by MB1 to MB4 (whether these consist of 16×16 or 8×8 pixels) arranged on one and the same horizontal line of a local buffer (for immediate reference consider the module 122 of FIG. 4), these are made available in a number of at least three to the horizontal filter (module 116 of FIG. 4). This implements the multiplication of the above-mentioned macroblocks by an appropriate number of matrices of the size H×V, thus obtaining, after merging (module 116a) a new set with halved horizontal definition (HHD).

The blocks thus generated are stored and arranged on the same vertical line of a second local buffer (module 124 in FIG. 4) so as to make at least three of them available to the vertical filter (module 118 in FIG. 4). This multiplies the macroblocks by an appropriate number of matrices having the size H×V, thus obtaining a new set with halved vertical definition.

In this way, the equivalent macroblock (shown in the right-hand part of FIG. 5) can be sent to the module 130 together with the data coming from, the module 112 and the data of the module 128, which redefines the macroblock parameters.

The same module 128 moreover redefines the value of the scale code of the quantizer (quantizer_scale_code); optionally, the one present in the input bitstream IS may be re-used.

In the module 130, the new macroblock is thus generated, which is to be sent to the VLC coding module designated by 132.

It will be appreciated that the main advantage of the solution according to an embodiment of the present invention derives, in terms of computational gain, from the elimination of the motocompensation, estimate of motion, and inverse and direct cosine transform blocks.

Of course, without prejudice to the principle of the invention, the details of implementation and the embodiments may vary widely with respect to what is described and illustrated herein, without thereby departing from the scope of the present invention as defined in the annexed claims.

What is claimed is:

1. A process for generating an output MPEG bitstream from an MPEG input bitstream, said output MPEG bitstream having at least one entity chosen among syntax, resolution, and bitrate modified with respect to said input bitstream, the process comprising:

distinguishing, in said input bitstream, non-affecting portions that substantially do not affect variation in bitrate and affecting portions that substantially do affect variation in bitrate;

when said syntax is to be modified between said input bitstream and said output bitstream, subjecting said non-affecting portions of said input bitstream to translation of said syntax into the syntax of said output bitstream and transferring said non-affecting portions subjected to syntax translation to said output bitstream;

when said resolution is to be modified between said input bitstream and said output bitstream, subjecting said non-affecting portions of said input bitstream to translation of said resolution into the resolution of said output bitstream and transferring said non-affecting portions subjected to the resolution translation to said output bitstream;

transferring said affecting portions from said input bitstream to said output bitstream in substantial absence of processing operations when said resolution is left unaltered between said input bitstream and said output bitstream; and when said resolution is modified between said input bitstream and said output bitstream, subjecting said affecting portions of said input bitstream to a filtering in the domain of the discrete cosine transform, then transferring said affecting portions subjected to filtering in the domain of the discrete cosine transform to said output bitstream; and carrying out a scaling of a motion field to enable association with pixel macroblocks having a resolution corresponding to the modified resolution of said output bitstream when said resolution is to be modified between said input bitstream and said output bitstream, wherein said scaling of the motion field includes an operation of applying to motion vectors associated with said input bitstream a transformation that correlates the motion vectors to a given number of motion vectors associated with at least one of the macroblocks;

wherein said at least one of the macroblocks is from a set made up of:

macroblocks that are to be merged into a new macroblock; and macroblocks that surround the ones that are to be merged into the new macroblock;

wherein said transformation applied to the motion vectors associated with said input bitstream comprises the operations of:

multiplying said motion vectors by respective weighting factors;

accumulating the results of the above multiplication; and dividing the results accumulated by the sum of said weighting factors.

2. The process according to claim 1, wherein said non-affecting portions and said affecting portions of said input bitstream are distinguished by parsing headers of said input bitstream.

3. The process according to claim 1 wherein said filtering operation in the domain of the discrete cosine transform comprises the operations of:

storing a given number of macroblocks aligned on one and the same line; and multiplying said macroblocks by at least one matrix with a scaled definition factor.

4. The process according to claim 3 wherein said given number of aligned macroblocks are aligned on one and the same horizontal line, and in that said definition factor is scaled in the horizontal direction.

5. The process according to claim 3 wherein said given number of aligned macroblocks are aligned on one and the same vertical line, and in that said definition factor is scaled in the vertical direction.

6. The process according to claim 3, further comprising the operation of storing both a given number of macroblocks aligned on one and the same horizontal line and a given number of macroblocks aligned on one and the same vertical line, so that said definition factor is scaled both in the horizontal direction and in the vertical direction.

7. The process according to any one of claims 3 wherein said given number of macroblocks comprises at least three macroblocks.

8. The process according to claim 1 wherein said macroblocks with modified resolution undergo VLC coding before being transferred to said output bitstream.

9. The process according to claim 1, further comprising an operation of selectively varying a quantization-scaling code between said input bitstream and said output bitstream.

10. A system for generating an output MPEG bitstream from an input MPEG bitstream, said output MPEG bitstream having at least one entity chosen among syntax, resolution, and bitrate modified with respect to said input bitstream, the system comprising:

a sorting module configured to distinguish in said input bitstream, first portions and second portions that respectively substantially do not affect and do affect the variation in bitrate;

a syntax module configured to subject said first portions of said input bitstream to the translation of said syntax into the syntax of said output bitstream, said syntax module configured to transfer said first portions subjected to syntax translation to said output bitstream when said syntax is to be modified between said input bitstream and said output bitstream;

a resolution module configured to subject first portions of said input bitstream to the translation of said resolution into the resolution of said output bitstream, said resolution module configured to transfer said first portions subjected to resolution translation to said output bitstream when said resolution is to be modified between said input bitstream and said output bitstream;

a transfer line configured to transfer said second portions from said input bitstream to said output bitstream in the substantial absence of processing operations when said resolution is to be left unaltered between said input bitstream and said output bitstream; and a processing set configured to subject said second portions of said input bitstream to a filtering in the domain of the discrete cosine transform and configured to transfer said second portions subjected to filtering in the domain of the discrete cosine transform to said output bitstream when said resolution is to be modified between said input bitstream and said output bitstream, wherein said processing set includes at least one element configured to scale a motion field in order to enable association to pixel macroblocks having a resolution corresponding to the modified resolution of said output bitstream;

wherein said at least one of the macroblocks is from a set made of:

macroblocks that are to be merged into a new macroblock; and macroblocks that surround the macroblocks that are to be merged into the new macroblock;

wherein said at least one element is configured to apply to motion vectors associated with said input bitstream a transformation to correlate the motion vectors to a given number of motion vectors associated with at least one of the macroblocks, wherein said at least one element is configured to:

multiply said motion vectors by respective weighting factors;

accumulating the results of the above multiplication; and divide the results accumulated by the sum of said weighting factors.

11. The system according to claim 10 wherein said sorting module is configured to distinguish between said first portions and said second portions of said input bitstream by parsing headers of said input bitstream.

12. The system according to claim 10 wherein said processing set to execute said filtering in the domain of the discrete cosine transform by being further configured to:

store a given number of macroblocks aligned on one and the same line; and multiply said macroblocks by at least one matrix with a scaled definition factor.

13. The system according to claim 12 wherein said processing set is further configured to execute said filtering such that said given number of aligned macroblocks are aligned on one and the same horizontal line, and such that said definition factor is scaled in the horizontal direction.

14. The system according to claim 12 wherein said processing set is further configured to execute said filtering such that said given number of aligned macroblocks are aligned on one and the same vertical line, and such that said definition factor is scaled in the vertical direction.

15. The system according to claim 12 wherein said processing set is configured to carry associated storage elements configured to store both a given number of macroblocks aligned on one and the same horizontal line and a given number of macroblocks aligned on one and the same vertical line, so that said definition factor is scaled both in the horizontal direction and in the vertical direction.

16. The system according to claim 12 wherein said given number of macroblocks includes at least three macroblocks.

17. The system according to claim 10, further comprising a VLC coding module configured to subjecting said macroblocks with modified resolution to VLC coding before said macroblocks are transferred to said output bitstream.

18. The system according to claim 10, further comprising a variator module configured to selectively vary a quantization-scaling code between said input bitstream and said output bitstream.

19. A computer program product directly loadable in the memory of a digital computer and comprising software code portions for causing a computer to generate an output MPEG bitstream from an MPEG input bitstream, said MPEG output bitstream having at least one entity chosen among syntax, resolution, and bitrate modified with respect to said input bitstream, by:
  distinguishing, in said input bitstream, non-affecting portions that substantially do not affect variation in bitrate and affecting portions that substantially do affect variation in bitrate;
  subjecting said non-affecting portions of said input bitstream to translation of said syntax into the syntax of said output bitstream by transferring said non-affecting portions subjected to syntax translation to said output bitstream when said syntax is to be modified between said input bitstream and said output bitstream;
  subjecting said non-affecting portions of said input bitstream to translation of said resolution into the resolution of said output bitstream by transferring said non-affecting portions subjected to the resolution translation to said output bitstream when said resolution is to be modified between said input bitstream and said output bitstream;
  transferring said affecting portions from said input bitstream to said output bitstream in substantial absence of processing operations when said resolution is left unaltered between said input bitstream and said output bitstream;
  subjecting said-affecting portions of said input bitstream to a filtering in the domain of the discrete cosine transform, then transferring said affecting portions subjected to altering in the domain of the discrete cosine transform to said output bitstream when said resolution is to be modified between said input bitstream and said output bitstream; and
  scaling a motion field to enable association with pixel macroblocks having a resolution corresponding to the modified resolution of said output bitstream when said resolution is to be modified between said input bitstream and said output bitstream, wherein said scaling of the motion field includes an operation of applying to motion vectors associated with said input bitstream a transformation that correlates the motion vectors to a given number of motion vectors associated with at least one of the macroblocks;
  wherein said at least one of the macroblocks is from a set made up of:
  macroblocks that are to be merged into a new macroblock; and
  macroblocks that surround the ones that are to be merged into the new macroblock;
  wherein said transformation applied to the motion vectors associated with said input bitstream comprises the operations of:
  multiplying said motion vectors by respective weighting factors;
  accumulating the results of the above multiplication; and
  dividing the results accumulated by the sum of said weighting factors.

20. The computer program product of claim 19, wherein said non-affecting portions and said affecting portions of said input bitstream are distinguished by parsing headers of said input bitstream.

21. The computer program product of claim 19 wherein said filtering in the domain of the discrete cosine transform comprises:
  storing a given number of macroblocks aligned on one and the same line; and
  multiplying said macroblocks by at least one matrix with a scaled definition factor.

22. The computer program product of claim 21 wherein said given number of aligned macroblocks are aligned on one and the same horizontal line, and in that said definition factor is scaled in the horizontal direction.

23. The computer program product of claim 21 wherein said given number of aligned macroblocks are aligned on one and the same vertical line, and in that said definition factor is scaled in the vertical direction.

24. The computer program product of claim 21, further comprising software code portions for causing the computer to store both a given number of macroblocks aligned on one and the same horizontal line and a given number of macroblocks aligned on one and the same vertical line, so that said definition factor is scaled both in the horizontal direction and in the vertical direction.

25. The computer program product of claim 21 wherein said given number of macroblocks comprises at least three macroblocks.

26. The computer program product of claim 19 wherein said macroblocks with modified resolution undergo VLC coding before being transferred to said output bitstream.

27. The computer program product of claim 18, further comprising software code portions for causing the computer to selectively vary a quantization-scaling code between said input bitstream and said output bitstream.

* * * * *

UNITED STATES PATENT AND TRADEMARK OFFICE
CERTIFICATE OF CORRECTION

PATENT NO. : 7,010,041 B2  Page 1 of 1
APPLICATION NO. : 10/072818
DATED : March 7, 2006
INVENTOR(S) : Andrea Graziani et al.

It is certified that error appears in the above-identified patent and that said Letters Patent is hereby corrected as shown below:

Column 13,
Line 55, "altering" should read as --filtering--.

Signed and Sealed this

Fourth Day of July, 2006

JON W. DUDAS
*Director of the United States Patent and Trademark Office*